July 20, 1943.   C. D. REED   2,324,953
APPARATUS FOR USE IN THE MANUFACTURE OF NUTS
Original Filed March 28, 1941   2 Sheets-Sheet 1
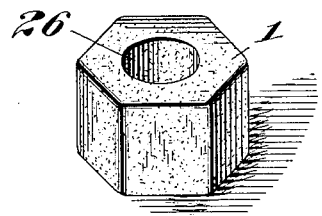
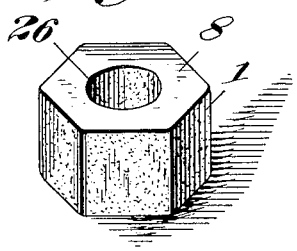
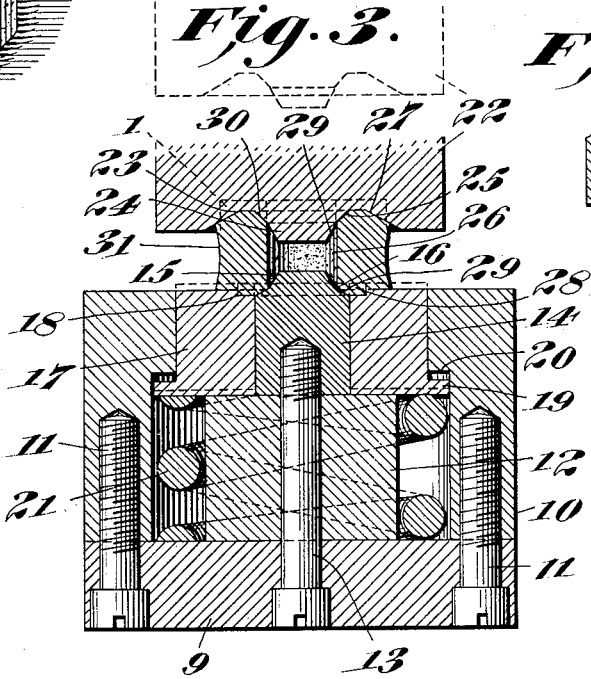
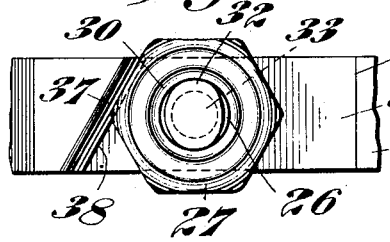
Inventor
Claude D. Reed.
By R. S. C. Dougherty
Attorney

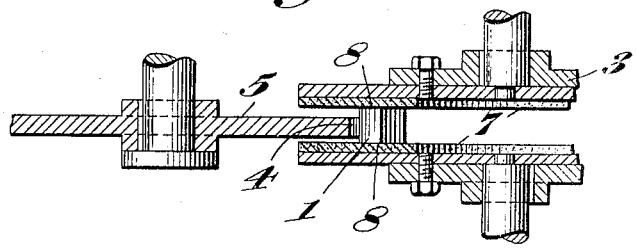
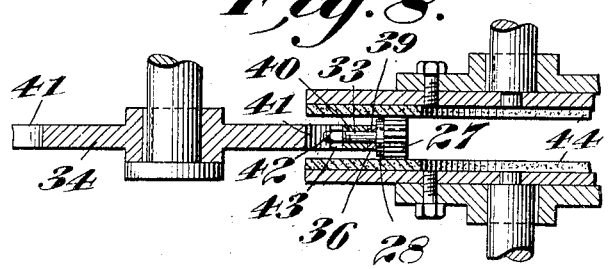
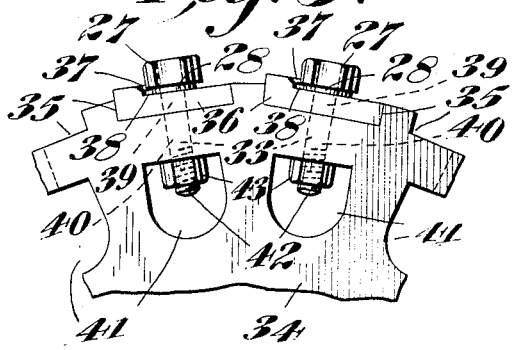
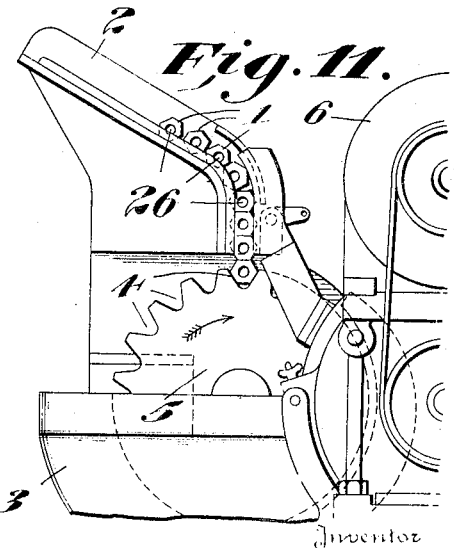
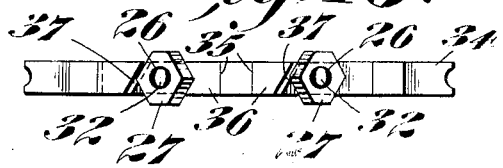

Patented July 20, 1943

2,324,953

UNITED STATES PATENT OFFICE 2,324,953

APPARATUS FOR USE IN THE MANUFACTURE OF NUTS

Claude D. Reed, Lebanon, Pa., assignor to Bethlehem Steel Company, a corporation of Pennsylvania Original application March 28, 1941, Serial No. 385,643. Divided and this application April 30, 1942, Serial No. 441,115

7 Claims. (Cl. 51—118)

This invention relates to apparatus for use in the manufacture of nuts having a finished polished surface and is a division of my copending application Serial No. 385,643, filed March 28, 1941, and relates more particularly to the manner of forming the projecting pin and holder for retaining the nut blanks in proper position on the carrier disk during the grinding of the sides.

In the above mentioned copending application which relates to the steps in the manufacture of hexagonal shaped nuts or the like made by hot pressed forging in which the blank is taken cold and the top and bottom ends ground or polished smooth. The blank is then placed between dies and the smooth ends cold forged to produce a crowned top and an integrally formed washer face on the bottom surface of the blank. During this operation beveled surfaces are also formed by the dies at the ends of the axial opening of the blanks to facilitate threading of the same. This cold forging of the crown and washer on the ends of the nut blank distorts the sides of the same. The sides of the nut blank are then ground to remove this distortion and to form a smooth polished surface, after which the interior portion of the nut is threaded to complete the nut forming operation.

Referring now to the accompanying two sheets of drawings forming a part of this specification and in which like characters refer to like parts:

Figure 1 is a perspective view of a nut blank formed by a hot pressed forging operation and indicating the rough outer surface thereof;

Fig. 2 is a perspective view of the nut blanks shown in Fig. 1 after the ends of the blanks have been ground smooth;

Fig. 3 is a vertical section showing the die forming operation for producing the crown and washer on the top and bottom surfaces of the nut blank and also for producing the chamfered surfaces at the ends of the axial opening formed therein;

Fig. 4 is a side elevation showing the finished outer surface of the nut blank;

Fig. 5 is a vertical section of the finished nut after the screw threading operation;

Fig. 6 is an enlarged detail top plan view illustrating the manner of holding the nut blanks on the carrier disk during the side surfacing of the same;

Fig. 7 is a detail view illustrating the manner of holding and grinding the ends of a nut blank;

Fig. 8 is a detail view illustrating the manner of holding and grinding the sides of a nut blank;

Fig. 9 is a detail side elevation of a portion of the carrier disk showing the manner of attaching the retainer pins and nut holders thereto;

Fig. 10 is a top plan view of the portion of the carrier disk shown in Fig. 9; and Fig. 11 illustrates the manner of feeding the nut blanks to the machine for grinding the ends of the blanks as shown in Fig. 7.

Referring now to the various characters of reference upon the drawings, the numeral 1 designates a nut blank formed by hot pressed forging having a rough exterior surface. The cold blank 1 is then fed into a chute 2, of a machine 3, where it is fed by gravity into the notches 4 of a carrier disk 5. It is then advanced by means of a motor drive 6 between a pair of rotating grinding disks 7 where the ends 8 of the nut blanks are ground smooth and polished. The nut blank is then inserted between dies as indicated in dotted line in the mechanism shown in Fig. 3. This mechanism comprises a bottom plate 9 for a die shell 10 which is attached thereto by means of bolts 11. A filler block 12 is mounted centrally on the bottom plate 9 for the die shell 10 upon which is mounted centrally and secured in position by means of a bolt 13 a countersinking die 14 which is provided with a pair of beveled extending portions 15 and 16. Surrounding the countersinking die 14 is a facing die 17 having an annular recess 18 formed in its upper surface for the purpose of forming a washer face on the nut blank and has a flange 19 extending outwardly from its lower edge adapted to engage an inwardly extending flange 20 of the shell 10. Surrounding the filler block 12 within the die shell 10 between the bottom die plate 9 and the flanged end 19 of the facing die 17 is a helical spring 21 which is normally adapted to hold the facing die 17 in its raised position. Adapted to reciprocate above the countersinking die 14 and the facing die 17 is a crowning die 22 having a recess 23 formed therein for this purpose, and a projecting central portion with double beveled surfaces 24 and 25.

When the nut blank having its ends ground and polished is inserted between the dies shown in Fig. 3 the crowning die 22 is raised and the blank is placed on the countersinking die 14 with the beveled end 15 extending into the lower end of the axial opening 26 formed in the nut blank thereby centering the blank thereon at the lower end as indicated in dotted lines. The crowning die 22 is then advanced, the beveled projecting portion 24 entering the top end of the axial opening 26 to center the upper end of the blank and then advanced to the position shown in full lines in Fig. 3 thereby cold forging a crown 27 on one end of the blank and a washer face 28 on the opposite end, at the same time the top and bottom end edges of the axial opening 26 will be chamfered as indicated at 29 and 30 by means of the beveled projections 16 and 25 of the countersinking die 14, and the crowning die 22, respectively. Owing to the pressure exerted on the ends of the blank during this operation the sides of the blank will be formed slightly concaved as indicated at 31.

After cold forging the ends of the nut blank as above described, the crowning die 22 is again raised to the dotted line position and the helical spring 21 will exert pressure on the facing die 17 thereby stripping the nut blank from the end of the countersinking die 14. The blank can then be removed by the operator and another blank placed between the dies and this operation repeated.

After the nut blank has been crowned and a washer face formed thereon it is fed to a machine for grinding the sides of the blank. I am aware that grinding and finishing the ends and sides of nut blanks are old and well known in the art of nut manufacture. A machine adapted for this purpose is disclosed in a patent issued to Jones, No. 1,923,931, dated August 22, 1933, and although this patent is shown adapted for grinding the sides of nut blanks, by changing the carrier disk to the form shown in Fig. 11 of this application it could be altered for grinding the ends of the nut blanks equally as well.

The crowned nut blank with the washer face formed thereon is now fed to a machine similar to the one disclosed in the above mentioned Jones patent and preferably placed manually on one of a plurality of the projecting stud ends 32 of a retaining pin 33 which are secured to the peripheral edge of a carrier disk 34. The peripheral edge of the carrier disk 34 is provided with recesses 35 each adapted to receive a nut holder 36 having beveled and radially extending inclined projecting surfaces 37 and 38, respectively, adapted to engage one side edge of the nut blank as indicated in Figs. 6, 9 and 10 to hold the nut blank and prevent it from turning during the grinding operation.

The stud end 32 of the retaining pin 33 is somewhat larger than the shank of the same which extends radially through registering holes 39 and 40 in the nut holder 36 and the carrier disk 34, respectively, with the inner end projecting into an opening 41 in the said carrier disk adjacent to the recess 35 and is threaded as at 42 to receive a nut 43.

After each nut blank has been advanced by the carrier disk 34 between the grinding disks 44 and the two adjacent sides have been ground the nut blank is indexed by rotating it a partial revolution to present another pair of side surfaces to the grinding disk. If the nut blank is for a hexagon sided nut it will be indexed twice and then ejected from the machine, all of which is described in the Jones patent.

It has been found by actual practice that if a nut blank is placed on a plain stud extending from the carrier disk without any backing that the nut blank is liable to turn somewhat while passing between the grinding disk thereby cutting more from one side of the blank than from the adjacent side so that the sides are not uniform, and in order to obviate this, the studs 32 are made oval in cross-section and slightly smaller than the axial opening 26 in the blank 1 as indicated in Fig. 6, thereby allowing the inclined sides of the blank to adjust itself to the inclined surfaces 37 and 38 but enabling the blank to be indexed and more easily ejected from the machine. After which the blank is threaded to produce a finished nut.

Although I have shown and described my invention in considerable detail, I do not wish to be limited to the exact and specific details shown and described, but may use such substitutions, modifications or equivalents thereof, as are embraced within the scope of my invention or as pointed out in the claims.

Having thus described my invention, what I claim as new and desire to secure by Letters Patent is:

1. In a machine for finishing the sides of nut blanks, comprising a pair of rotary grinding disks arranged in spaced relation, a continuously rotating carrier disk for moving a plurality of blanks in series between the grinding disk, recesses formed in the peripheral edge of the carrier disk, a nut blank holder seated in each recess, a transverse opening through the disk adjacent to each recess, registering holes extending radially through each nut blank holder and the carrier disk to the transverse opening through the carrier disk, a retaining pin in each of the radially extending holes in the nut blank holder and the carrier disk, a nut in each of the transverse openings in the carrier disk threaded on the inner end of each retaining pin for securing each nut blank holder to the peripheral edge of the carrier disk, a stud projection oval in cross-section extending from each retaining pin adapted to extend into the axial perforation of each nut blank, an extending portion for each blank holder having beveled and radially inclined surfaces for engaging one side of the blank coacting with the oval shaped stud projection for holding the opposite sides of the blank in parallel alignment during the grinding operation.

2. In a machine for finishing the sides of nut blanks having an axial perforation, comprising a pair of rotary grinding disks arranged adjacent to each other in spaced relation, a rotary carrier disk for moving a plurality of blanks in series between the grinding disks, recesses formed in the peripheral edge of the carrier disk, a blank holder seated in each recess, a retaining pin for securing each blank holder to the peripheral edge of the carrier disk, a stud projection oval in cross-section extending from each retaining pin adapted to extend into the axial perforation of each blank, an extending portion for each blank holder having beveled and radially inclined surfaces for engaging one side of the blank coacting with the oval shaped stud projection for normally holding the opposite sides of the blank in parallel alignment during the grinding operation.

3. In a machine for finishing the sides of blanks having an axial perforation, comprising a pair of coacting rotary grinding disks arranged adjacent to each other in spaced relation, a rotary carrier disk for moving a plurality of blanks in series between the grinding disks, stud projections oval in cross-section extending from the peripheral edge of the carrier disk each adapted to extend into the axial perforation of a blank, and an extending portion on the peripheral edge of the rotary carrier adjacent to each stud projection having beveled and radially inclined surfaces adapted to coact with the stud projection for normally holding the opposite sides of the blank in parallel alignment during the grinding operation.

4. In a machine for finishing the sides of nut blanks having an axial perforation, comprising a pair of rotary grinding disks arranged in spaced relation, a rotary carrier disk for moving a plurality of nut blanks in series between the grinding disks, recesses formed in the peripheral edge of the carrier disk, a nut blank holder seated in each recess, a transverse opening through the carrier disk adjacent to each recess, registering holes extending radially through each nut blank holder and the carrier disk, a retaining pin in each of the radially extending holes in the nut blank holder and the carrier disk having means for rigidly securing the nut blank holder to the carrier disk, a stud projection for each retaining pin adapted to extend into the axial perforation of each nut blank, and an extending portion for each blank holder having beveled and radially inclined surfaces for engaging one side of the blank and coacting with the stud projection for holding opposite sides of the blank in parallel alignment during the grinding operation.

5. In a machine for finishing the sides of nut blanks having an axial perforation, comprising a pair of rotary grinding disks arranged in spaced relation, a rotary carrier disk for moving a plurality of nut blanks in series between the grinding disks, recesses formed in the peripheral edge of the carrier disk, a nut blank holder seated in each recess, a transverse opening through the carrier disk adjacent to each recess, registering holes extending radially through each nut blank holder and the carrier disk, a retaining pin in each of the radially extending holes in the nut blank holder and the carrier disk having a threaded end extending into the transverse openings in the carrier disk, and an enlarged stud projection oval in cross-section extending from each retaining pin adapted to engage the nut blank holder and to extend into the axial perforation of each nut blank, a nut on each of the threaded ends of the retaining pins in the transverse openings for clamping the inner surface of the stud projection against the face of the nut blank holder, and an extending portion for each nut blank holder having beveled and radially inclined surfaces for engaging one side of the nut blank coacting with the oval shaped stud projection for holding the opposite sides of the nut blank in parallel alignment during the grinding operation.

6. In a machine for finishing the sides of nut blanks having an axial perforation, comprising a pair of rotary grinding disks arranged opposite each other in spaced relation, a rotary carrier disk for moving a plurality of nut blanks in series between the grinding disks, a plurality of recesses in the peripheral edge of the carrier disk, a nut blank holder removably inserted in each recess, a transverse opening through the carrier disk adjacent to each recess, registering holes extending radially through each nut blank holder and the carrier disk to the transverse opening, a bolt extending through each of the registering radially extending holes in the nut blank holder and carrier disk having its inner end threaded and projecting into the transverse opening, said bolt having a stud head projection for engaging the nut blank holder and to extend into the axial perforation in the nut blank, a nut on the threaded end of the bolt in the transverse opening for securing the nut blank holder in position, and an extending portion for each nut blank holder having beveled and radially inclined surfaces for engaging one side of the nut blank coacting with the stud head projection of the bolt for holding the opposite sides of the nut blank in parallel alignment during the grinding operation.

7. In a machine for finishing the sides of nut blanks having an axial perforation, comprising a pair of rotating grinding disks arranged in spaced relation, a rotary carrier disk for moving a plurality of nut blanks in series between the grinding disks, recesses formed in the peripheral edge of the carrier disk, a removable nut blank holder seated in each recess, a retaining pin for each nut blank holder having a stud projection oval in cross-section for engaging the outer central portion of the nut blank holder each adapted to extend into the axial perforation of a nut blank, means on the retaining pins for clamping the nut blank holders to the rotary carrier disk, and an extending portion for each nut blank holder having beveled and radially inclined surfaces for engaging one side of the nut blank coacting with the stud projection of the retaining pin for holding the opposite sides of the nut blanks in parallel alignment during the grinding operation.

CLAUDE D. REED.